United States Patent

Nakanishi et al.

[11] 3,927,011
[45] Dec. 16, 1975

[54] 2-AMINOALKYL-1-(PYRIDYLCARBONYL-PHENYL)IMIDAZOLE COMPOUNDS

[75] Inventors: Michio Nakanishi, Oita; Tetsuo Yokobe, Fukuoka; Tomio Arai, Fukuoka; Masao Abe, Fukuoka, all of Japan

[73] Assignee: Yoshitomi Pharmaceutical Industries, Ltd., Osaka, Japan

[22] Filed: Jan. 9, 1974

[21] Appl. No.: 432,115

[30] Foreign Application Priority Data

| May 10, 1973 | Japan | 48-52232 |
| May 14, 1973 | Japan | 48-53826 |
| June 16, 1973 | Japan | 48-68116 |
| July 7, 1973 | Japan | 48-76945 |

[52] U.S. Cl. ............ 260/296 R; 424/248; 424/250; 424/263; 424/267; 424/273; 260/247.5 D; 260/268 K; 260/293.69; 260/309
[51] Int. Cl.² .................................. C07D 213/36
[58] Field of Search .................. 260/296 R, 309

[56] References Cited
UNITED STATES PATENTS

| 3,637,702 | 1/1972 | Hoff et al. | 260/309 X |
| 3,712,892 | 1/1973 | Inaba et al. | 260/296 R X |
| 3,763,178 | 10/1973 | Sulkowski | 260/296 X |
| 3,763,179 | 10/1973 | Gall | 260/309 |

*Primary Examiner*—John D. Randolph
*Attorney, Agent, or Firm*—Sughrue, Rothwell, Mion, Zinn & Macpeak

[57] ABSTRACT

2-Aminoalkyl-1-(pyridylcarbonylphenyl)imidazole compounds of the formula:

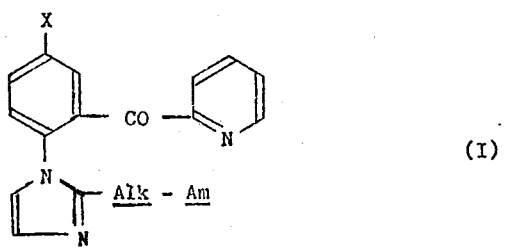

and pharmaceutically acceptable acid addition salts thereof, wherein
X is H, nitro or halogen,
Alk is methylene ($-CH_2-$) or ethylene ($-CH_2CH_2-$), and
Am is dialkylamino, N-alkyl-N-aralkyl-amino, 1-pyrrolidinyl, piperidino, morpholino or 4-methyl-1-piperazinyl, in which definitions the term "alkyl" means that the alkyl group has no more than 4 carbon atoms, and the aralkyl group is selected from the group consisting of benzyl, chlorobenzyl, methylbenzyl, methoxybenzyl, phenethyl and dimethoxyphenethyl,
and pharmaceutical compositions containing the same, and methods of treating cerebral dysfunction in mammals therewith are disclosed.

1 Claim, No Drawings

2-AMINOALKYL-1-(PYRIDYLCARBONYL-PHENYL)IMIDAZOLE COMPOUNDS

BACKGROUND OF THE INVENTION

1. Field of the Invention

The present invention relates to 2-aminoalkyl-1-(pyridylcarbonylphenyl)imidazole compounds and acid addition salts thereof having therapeutically valuable properties, pharmaceutical compositions containing the said compound and the use thereof.

2. Description of the Prior Art

Compounds of the formula:

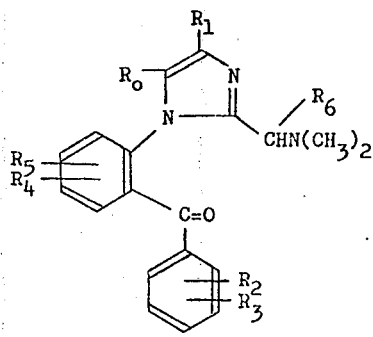

and pharmaceutically acceptable acid addition salts thereof, wherein $R_0$ and $R_1$ are each H, $C_{1-3}$ alkyl or hydroxymethyl, $R_2$, $R_3$, $R_4$ and $R_5$ are each H, $C_{1-3}$ alkyl, halogen, nitro, trifluoromethyl, $C_{1-3}$ alkyl, $C_{1-3}$ alkylthio, $C_{1-3}$ alkylsulfinyl, $C_{1-3}$ alkylsulfonyl or di($C_{1-3}$ alkyl)amino, and $R_6$ is H or $C_{1-3}$ alkyl, are disclosed in U.S. Pat. No. 3,763,179 and have utility as sedatives and tranquilizers.

SUMMARY OF THE INVENTION

This invention concerns 2-aminoalkyl-1-(pyridylcarbonylphenyl)-imidazole compounds of the formula:

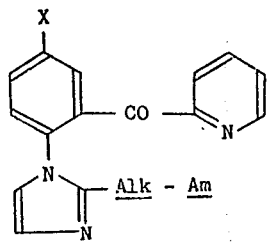

and pharmaceutically acceptable acid addition salts thereof, pharmaceutical compositions containing the said compound and the use thereof.

In the above formula, X represents a hydrogen atom, a nitro group or a halogen atom (e.g. F, Cl or Br); Alk represents a methylene group or an ethylene group; and Am represents a dialkylamino group, an N-alkyl-N-aralkylamino group, a 1-pyrrolidinyl group, a piperidino group, a morpholino group or a 4-methyl-1-piperazinyl group, in which definitions the term alkyl means that the alkyl group has no more than 4 carbon atoms (e.g. methyl, ethyl, propyl, isopropyl, butyl, iso-butyl or sec-butyl), and the aralkyl group is selected from the group consisting of benzyl, chlorobenzyl, methylbenzyl, methoxybenzyl, phenethyl and dimethoxyphenethyl.

The novel compounds encompassed within the formula presented above exhibit pharmacological activities in the form of protective activities on cerebral hypoxic or anoxic conditions, and cerebral blood flow increasing activity, which activities permit such compounds to be employed in the treatment of cerebral dysfunction, for example, cerebral arteriosclerosis, cerebral apoplexy and head trauma, due to cerebral anoxia, cerebral metabolic dysfunction, decrease in cerebral blood flow and so on.

The toxicity of the compounds of the invention in mice and rat is of very low order.

DETAILED DESCRIPTION OF THE INVENTION

The imidazole compounds of the invention represented by formula (I) can be produced by one of the following methods (i) and (ii):

METHOD i.

Reaction of a compound of the formula:

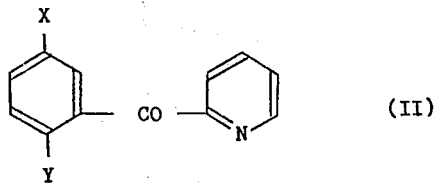

wherein Y is a halogen atom, and X is as defined above, with a compound of the formula:

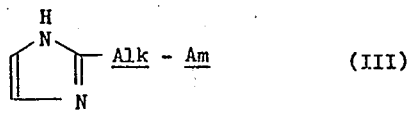

wherein Alk and Am are as defined above.

The reaction is carried out with use of the starting compound of formula (II) wherein Y is a fluorine atom or a chlorine atom, when X is a hydrogen atom or a halogen atom. However, when X is a nitro group, the reaction can be carried out with use of the starting compound of formula (II) wherein Y is not only a fluorine atom and a chlorine atom but also a bromine atom.

METHOD ii.

Reaction of a compound of the formula:

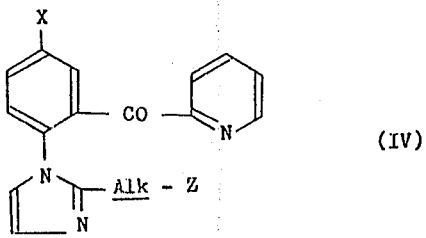

or a salt thereof such as the hydrochloride, wherein Z is a reactive atom or group, and X and Alk are as defined above, with an amine of the formula:

H-Am  (V)

or a salt thereof such as the hydrochloride, wherein Am is as defined above.

The reactive atom or group represented by Z in formula (IV) is, for example, a halogen atom, a phenylsulfonyloxy group, a p-tolylsulfonyloxy group or a methylsulfonyloxy group.

The reactions in methods (i) and (ii) are usually carried out in an inert solvent such as benzene, toluene, methanol, ethanol, acetone, methyl ethyl ketone, tetrahydrofuran, dimethylformamide, N-methylbutyrolactam, hexamethylphosphorotriamide, dimethyl sulfoxide or a mixture thereof, in the presence of an acid-acceptor such as triethylamine, sodium carbonate, potassium carbonate, sodium hydroxide, potassium hydroxide, sodium methoxide, sodium ethoxide, sodium hydride, sodium amide or powdery sodium, at a temperature of from about 0°C to refluxing temperature of the solvent employed, for a period of from about 1 to several hours.

The imidazole compounds of formula (I) thus produced can be converted into the corresponding acid addition salts in a conventional manner by treating the compound with various inorganic and organic acids, for example, hydrochloric, hydrobromic, sulfuric, oxalic, maleic and fumaric acids.

STARTING MATERIALS

The starting materials, namely compounds of formulas (III) and (IV) to be used in the production of the compounds of the present invention can be prepared by conventional methods described in the following.

1. Starting Materials of Formula (III)

The starting materials of formula (III) can be prepared by reacting a 1-benzyl-2-(hydroxyalkyl)imidazole of the formula:

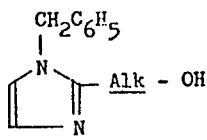  (A)

with thionyl chloride, and reacting the resulting compound of the formula:

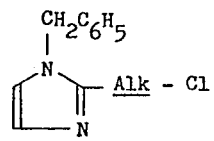  (B)

with an amine of formula (V), and subjecting the resulting compound of the formula:

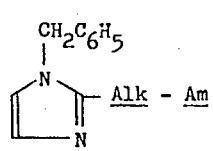  (C)

to debenzylation with use of metallic sodium in liquid ammonia.

2. Starting Materials of Formula (IV)

The starting materials of formula (IV) can be prepared by subjecting a 1-benzyl-2-(tetrahydropyran-2-yloxyalkyl)imidazole prepared from the reaction of a compound of formula (A) with dihydropyran, and having the formula:

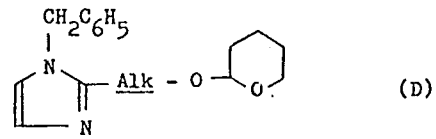  (D)

to debenzylation with use of metallic sodium in liquid ammonia, and reacting the resulting compound of the formula:

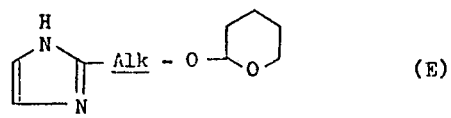  (E)

with a compound of formula (II), and hydrolyzing the resulting compound of the formula:

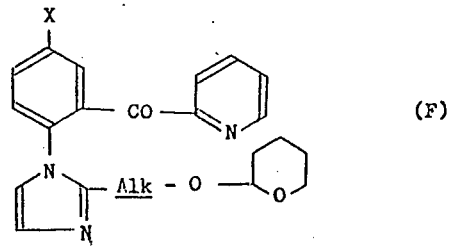  (F)

and reacting the resulting compound of the formula:

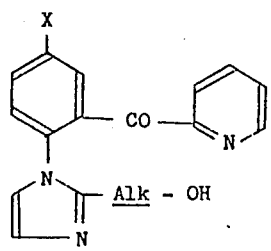  (G)

with a compound selected from the group consisting of thionyl halide, methanesulfonyl chloride, benzenesulfonyl chloride or p-toluenesulfonyl chloride.

The starting materials mentioned-above, even when they are oily and hygroscopic, may be used without purification, because they are obtained in high purity.

The compounds of formula (I) and pharmaceutically acceptable acid addition salts thereof are excellent in protective activities on cerebral hypoxic or anoxic conditions, and cerebral blood flow increasing activity. For example, the protective activity on cerebral asphyxic anoxia of the most preferred compound, 1-[4-nitro-2-(2-pyridylcarbonyl)phenyl]-2-(dimethylaminomethyl)imidazole fumarate, of the invention is illustratively demonstrated according to the following method:

The protective activity on asphyxic anoxia of the brain was tested by electroencephalographic studies in rats.

The experimental procedure employed was essentially similar to that described by Roser, I. et al. (Arch. Int. Pharmacodyn. Ther., vol. 194, pp. 375–380 (1971)). Wistar female rats weighing 160 to 210 g were used. After thiamylal sodium anesthesia the animals were immobilized with gallamine triethiodide, and electrocardiogram were recorded. The test compound was administered intraperitoneally as the suspension in 0.5% methylcellulose solution, and 30 minutes later the animals were subjected to asphyxic anoxia by stopping the artificial respiration. The cortical resistance time, the time elasped between stopping the artificial respiration and the cessation of cortical activity, was determined. The minimal effective dose (MED), a dose required to prolongate the cortical resistance time significantly compared with the control group, was assessed by Student's t test to be 0.1 mg/kg.

In view of various tests, including that mentioned above, the compounds of the invention and pharmaceutically acceptable acid addition salts thereof can be safely administered for the treatment of cerebral dysfunction, for example, cerebral arteriosclerosis, cerebral apoplexy and head trauma, in the form of a pharmaceutical preparation with a suitable and conventional pharmaceutically acceptable carrier, without adversely affecting the patients.

The pharmaceutical preparations can take any conventional form such as tablets, capsules, powders or injections.

FORMULATION EXAMPLES a. Tablets each containing 1 mg or 0.1 mg of an active ingredient are prepared from the following compositions:

|  | 1 mg Tablets | 0.1 mg Tablets |
|---|---|---|
| Compound (I) or its salt | 1.0 mg | 0.1 mg |
| Lactose | 66.3 | 67.2 |
| Corn Starch | 25.0 | 25.0 |
| Microcrystalline Cellulose | 6.0 | 6.0 |
| Methyl Cellulose | 1.0 | 1.0 |
| Magnesium Stearate | 0.7 | 0.7 |
|  | 100.0 mg | 100.0 mg |

(b) An 1% powder is prepared from the following compositions:
Compound (I) or its salt    1% by weight
Lactose    88
Microcrystalline Cellulose    10
Methyl Cellulose    1
    100%

(c) 0.1 mg or 0.5 mg injections are prepared from the following compositions:
Compound (I) or its salt soluble in water    0.1 mg or 0.5 mg
5% Glucose aqueous solution    A sufficient quantity to make 1.0 ml The daily dose of compound (I) or a salt thereof for human adults usually ranges from about 0.3 to 3 mg, in single or multiple dose, but it may vary depending upon the age, body weight, and/or severity of the conditions to be treated as well as the response to the medication.

The present invention will be better understood from the following examples, but they are not to be construed as limiting the present invention.

EXAMPLE 1

2-Chloro-5-nitrophenyl 2-pyridyl ketone (2.6 g) is added at 5°C to a homogenized mixture of 1.4 g of 2-(dimethylaminomethyl)imidazole, 0.6 g of a 50% suspension of sodium hydride in mineral oil, and 50 ml of dimethylformamide, and the whole mixture is stirred at room temperature for 1.5 hours. The reaction mixture is then poured into ice water, and the separated oil is extracted with ethyl acetate. The organic layer is extracted with 10% hydrochloric acid, the acid extract is neutralized with potassium carbonate, and the aqueous solution is reextracted with ethyl acetate. The extract is washed with water, dried over magnesium sulfate and concentrated under reduced pressure to give almost pure 1-[4-nitro-2-(2-pyridylcarbonyl)phenyl]-2-(dimethylaminomethyl)imidazole as pale brown oil, in 86% yield. The corresponding fumarate (base : acid = 1 mole : 1.5 moles; colorless crystals) shows a melting point of 142°–144°C.

EXAMPLE 2

A mixture of 3.4 g of 1-[4-nitro-2-(2-pyridylcarbonyl)phenyl]-2-(chloromethyl)imidazole, 1.7 g of dimethylamine hydrochloride, 3.5 g of sodium carbonate and 50 ml of dimethylformamide is stirred at 60°C for 2 hours. The reaction mixture is then poured into water, and the aqueous mixture is extracted with ethyl acetate. The extract is washed with water, dried over magnesium sulfate and concentrated under reduced pressure to give 2.9 g of 1-[4-nitro-2-(2-pyridylcarbonyl)phenyl]-2-(dimethylaminomethyl)imidazole as pale brown oil. The corresponding fumarate (base : acid = 1 mole : 1.5 moles; colorless crystals) shows a melting point of 142°–144°C.

Using the procedure set forth in the above examples, but substituting equivalent amount of the appropriate starting materials, the following imidazole compounds are also produced:

1. 1-[4-Nitro-2-(2-pyridylcarbonyl)phenyl]-2-(diethylaminomethyl)imidazole, pale yellow oil; its fumarate (base : acid = 1 mole : 1.5 moles), M.p. 128°–130°C, colorless crystals;
2. 1-[4-Nitro-2-(2-pyridylcarbonyl)phenyl]-2-(N-benzyl-N-methylaminomethyl)-imidazole oxalate, M.p. 172°–173°C, colorless crystals;
3. 1-[4-Nitro-2-(2-pyridylcarbonyl)phenyl]-2-[N-(p-methoxybenzyl)-N-methylaminomethyl]imidazole, M.p. 111°–113°C, colorless crystals;
4. 1-[4-Nitro-2-(2-pyridylcarbonyl)phenyl]-2-[N-methyl-N-(p-methylbenzyl)-aminomethyl]imidazole, pale yellow oil;

5. 1-[4-Nitro-2-(2-pyridylcarbonyl)phenyl]-2-[N-(o-chlorobenzyl)-N-methylaminomethyl]imidazole, pale yellow viscous oil;
6. 1-[4-Nitro-2-(2-pyridylcarbonyl)phenyl]-2-[N-(3,4-dimethoxyphenethyl)-N-methylaminomethyl]imidazole, pale yellow oil;
7. 1-[4-Nitro-2-(2-pyridylcarbonyl)phenyl]-2-(2-dimethylaminoethyl)imidazole, pale yellow oil;
8. 1-[4-Nitro-2-(2-pyridylcarbonyl)phenyl]-2-(piperidinomethyl)imidazole, pale brown oil; its fumarate (base : acid = 1 mole : 0.5 mole), M.p. 170°–172°C, colorless crystals;
9. 1-[4-Nitro-2-(2-pyridylcarbonyl)phenyl]-2-(1-pyrrolidinylmethyl)imidazole, M.p. 120°–122°C, pale yellow crystals; its fumarate (hemihydrate), M.p. 176°–178°C, colorless crystals;
10. 1-[4-Nitro-2-(2-pyridylcarbonyl)phenyl]-2-(4-methyl-1-piperazinylmethyl)-imidazole, M.p. 170°–172°C, colorless crystals; its oxalate (base : acid : H₂O = 1 mole : 2.5 moles : 0.5 mole), M.p. 130°–132°C, colorless crystals;
11. 1-[4-Nitro-2-(2-pyridylcarbonyl)phenyl]-2-(morpholinomethyl)imidazole, M.p. 209°–210°C, colorless crystals; its fumarate (base : acid = 1 mole : 0.5 mole), M.p. 203°–205°C (decomposition), colorless crystals;
12. 1-[4-Bromo-2-(2-pyridylcarbonyl)phenyl]-2-(dimethylaminomethyl)imidazole, pale brown oil; and
13. 1-[2-(2-pyridylcarbonyl)phenyl]-2-(dimethylaminomethyl)imidazole, pale yellow oil.

While the invention has been described in detail and with reference to specific embodiments thereof, it will be apparent to one skilled in the art that various changes and modifications can be made therein without departing from the spirit and scope thereof.

What is claimed is:
1. The compound:
1-[4-Nitro-2-(2-pyridylcarbonyl)phenyl]-2-(dimethylaminomethyl)imidazole and the pharmaceutically acceptable acid addition salts thereof.

* * * * *